United States Patent [19]
Watanabe et al.

[11] Patent Number: 5,852,274
[45] Date of Patent: Dec. 22, 1998

[54] ELECTRICALLY HEATABLE CATALYTIC CONVERTER

[75] Inventors: Kiyohiko Watanabe; Tohru Yoshinaga, both of Okazaki; Akihiro Izawa, Sapporo; Osamu Fujishiro, Nagoya, all of Japan

[73] Assignee: Nippon Soken, Inc., Japan

[21] Appl. No.: 525,459

[22] Filed: Sep. 7, 1995

[30] Foreign Application Priority Data

Sep. 7, 1994 [JP] Japan ..................................... 6-213695

[51] Int. Cl.⁶ ........................... B23K 11/00; B01D 53/34; F01N 3/10
[52] U.S. Cl. ....................... 219/117.1; 422/174; 422/180; 422/199; 422/222; 29/890
[58] Field of Search ....................... 422/177, 174, 422/180, 199, 211, 222; 60/300, 274, 299; 29/890; 502/439, 527; 428/116, 593; 228/181; 219/552–553, 117.1; 392/465–666, 485, 488, 494

[56] References Cited

U.S. PATENT DOCUMENTS

| | | | |
|---|---|---|---|
| 3,770,389 | 11/1973 | Kitzner et al. | 422/174 |
| 4,797,329 | 1/1989 | Kilbane et al. | 428/623 |
| 5,070,694 | 12/1991 | Whittenberger | 422/174 |
| 5,163,291 | 11/1992 | Hitachi et al. | 60/299 |
| 5,215,722 | 6/1993 | Nishizawa | 422/174 |

FOREIGN PATENT DOCUMENTS

| | | |
|---|---|---|
| 5-179939 | 7/1993 | Japan . |
| 5220404 | 8/1993 | Japan . |
| 5288036 | 11/1993 | Japan . |
| 671184 | 3/1994 | Japan . |

*Primary Examiner*—Hien Tran
*Attorney, Agent, or Firm*—Cushman Darby & Cushman Intellectual Property Group of Pillsbury Madison & Sutro, LLP

[57] ABSTRACT

An electrically heatable catalytic converter for internal combustion engines is provided. This catalytic converter includes a honeycomb multi-layered core member wound around an electrode. The multi-layered core member consists of a plurality of flat metal foil sheets and a plurality of corrugated metal foil sheets arranged alternately and bonded to each other for preventing the core member from telescoping in the direction of exhaust gas flow, especially, during high-load engine operation.

1 Claim, 6 Drawing Sheets

ELECTRICALLY HEATABLE CATALYTIC CONVERTER

BACKGROUND OF THE INVENTION

1. Technical Field

The present invention relates generally to a catalytic converter employed for treating exhaust gases of an internal combustion engine, and more particularly to an improved structure of a catalytic converter which is so designed as to resist telescoping of a honeycomb core in the direction of exhaust gas flow if subjected to high-load conditions for an extended period of time.

2. Background Art

Japanese Patent First Publication No. 5-220404 teaches a conventional electrically heatable catalytic converter employed for treating exhaust gases of an internal combustion engine.

This conventional catalytic converter, as shown in FIGS. 7 and 8, includes a plurality of strip layers 32, a central electrode 33, and a cylindrical casing 35. Each of the strip layers 32 consists of a flat thin metal foil sheet 30 and a corrugated thin metal foil sheet 31 attached to each other. Ends of the strip layers 32 are secured to an outer peripheral surface of the central electrode 33, while the other ends thereof are wound around the central electrode 33 in a scroll fashion to form a honeycomb catalyst carrier 34. After the catalyst carrier 34 is fully assembled, it is inserted into the casing 35, and then the outer ends of the strip layers 32 are secured to an inner wall of the casing 35. These arrangements prevent the catalyst carrier 34 from telescoping, which may cause the corrugated foil strips 31 project downstream of the exhaust gases. Specifically, the structure of the conventional catalytic converter serves to prevent the catalyst carrier 34 from being deformed, as shown in FIGS. 9 and 10, causing the catalyst carrier 34 to break up.

The above conventional catalytic converter, however, has suffered from the following drawback. Usually, a flow rate of exhaust gas is increased as an internal combustion engine is brought into high load conditions. Therefore, if the catalytic converter undergoes the increased flow rate of the exhaust gas for a long time, it may cause the strip layers 32 to telescope, as shown in FIG. 11, in the direction of gas flow and to be destroyed ultimately, as shown in FIG. 12.

SUMMARY OF THE INVENTION

It is therefore a principal object of the present invention to avoid the disadvantages of the prior art.

It is another object of the present invention to provide an improved structure of an electrically heatable catalytic converter which is so designed as to resist telescoping of a catalytic core member in the direction of exhaust gas flow if subjected to high-load conditions for an extended period of time.

According to one aspect of the present invention, there is provided an electrically heatable catalytic converter apparatus which comprises a cylindrical casing having a given length, an electrode disposed within the cylindrical casing, extending in a lengthwise direction of the cylindrical casing, a plurality of multi-layered members wound around the electrode in a scroll fashion within the cylindrical casing, each of the multi-layered members including a plurality of flat metal foil sheets and a plurality of corrugated metal foil sheets attached to the flat metal foil sheets, and an electrically insulating means for electrically insulating the multi-layered members from each other.

In the preferred mode of the invention, the flat metal foil sheets and the corrugated metal foil sheets are alternately bonded to each other.

The electrically insulating means includes insulating coatings formed on the flat metal foil sheets and the corrugated metal foil sheets. The insulating coatings may be formed with alumina under oxidation treatment.

According to a second aspect of the invention, there is provided an electrically heatable catalytic converter apparatus which comprises a cylindrical casing having a given length, an electrode disposed within the cylindrical casing, extending in a lengthwise direction of the cylindrical casing, a multi-layered member wound around the electrode in a scroll fashion to form a plurality of turns within the cylindrical casing, the multi-layered member including three or more layers attached to each other, each of layers including one flat metal foil sheet and one corrugated metal foil sheet attached to each other, and an electrically insulating means for electrically insulating each of the turns of the multi-layered member from the adjacent turns.

In the preferred mode of the invention, the electrically insulating means includes insulating coatings formed on the flat metal foil sheets and the corrugated metal foil sheets.

The electrically insulating means may alternatively include an insulating member interposed between the adjacent layers of the multi-layered member. The insulating member may be made from ceramic material.

According to a third aspect of the invention, there is provided a method for manufacturing an electrically heatable catalytic converter which comprises the steps of providing a plurality of multi-layered members each having a first end and a second end opposite to the first end and including a plurality of flat metal foil sheets and a plurality of corrugated metal foil sheets bonded to the flat metal foil sheets, respectively, attaching the multi-layered members at the first ends to an electrode and winding the multi-layered members around the electrode spirally, and attaching the spirally wound multi-layered members at the second ends to an inner wall of a cylindrical converter casing.

According to a fourth aspect of the invention, there is provided a method for manufacturing an electrically heatable catalytic converter which comprises the steps of winding a plurality of flat metal foil sheets and a plurality of corrugated metal foil sheets alternately around an electrode, interposing sheets of paper between one of the flat metal foil sheets and adjacent one of the corrugated metal foil sheets, respectively, so as to form multiple layers each including at least two of the flat metal foil sheets and at least two of the corrugated metal foil sheets, placing an electrode opposite an end surface of the wound multiple layers to weld the flat metal foil sheets and the corrugated metal foil sheets of each of the multiple layers, and disposing the welded multiple layers within a cylindrical converter casing.

According to a fifth aspect of the invention, there is provided a method for manufacturing an electrically heatable catalytic converter which comprises the steps of providing a multi-layered member including three or more layers each composed of one flat metal foil sheet and one corrugated metal foil sheet, attaching a portion of the multi-layered member to an electrode and winding the multi-layered member around the electrode spirally, and disposing the spirally wound multi-layered member within a cylindrical converter casing.

In the preferred mode of the invention, an insulating member is provided between adjacent ones of turns of the spirally wound multi-layered member.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
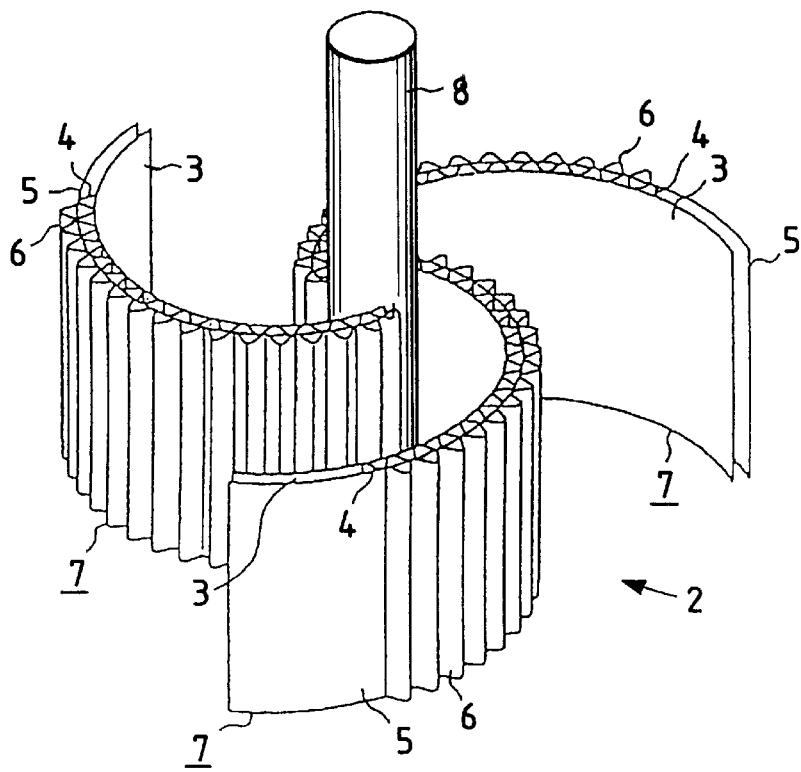
FIG. 1 is a perspective view which shows a catalyst carrier wound around an electrode according to the present invention.
Figure 2:
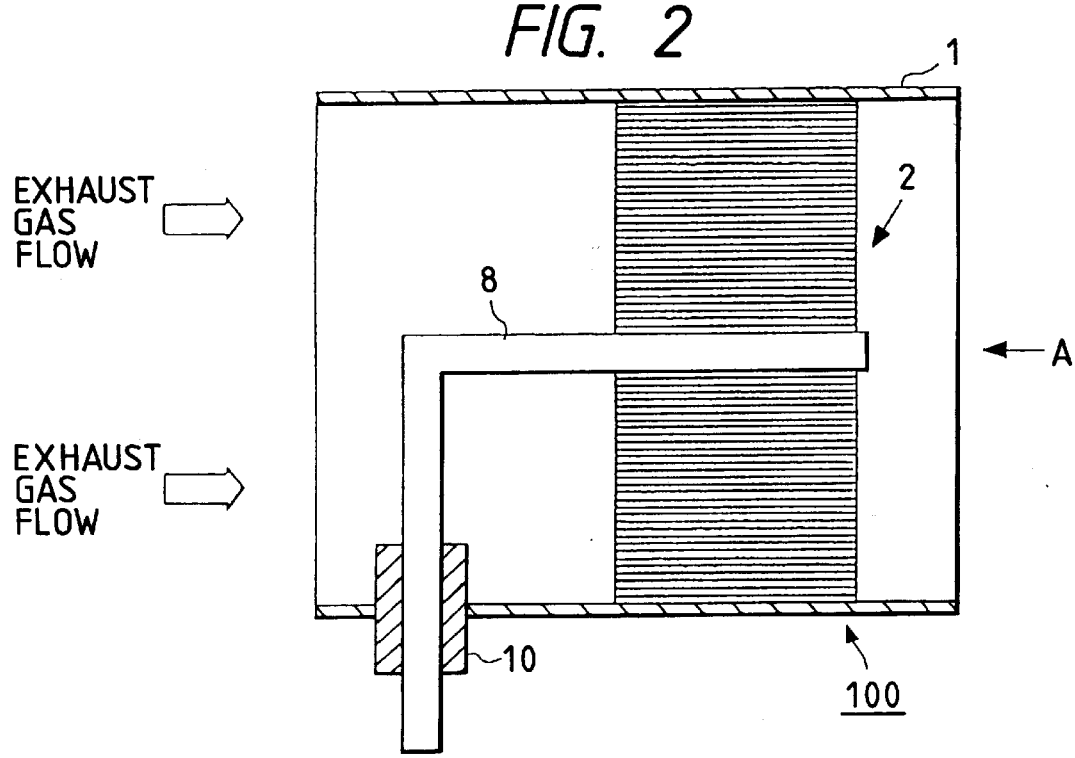
FIG. 2 is a cross sectional view which shows a catalytic converter apparatus according to the invention.

Referring now to the drawings, particularly to FIGS. 1 and 2, there is shown an electrically heatable catalytic converter 100 according to the present invention employed for treating exhaust gases of an internal combustion engine.

The catalytic converter 100 generally includes a cylindrical converter casing 1, a metallic honeycomb catalyst carrier 2, and an L-shaped central positive electrode 8.

The catalyst carrier 2 is disposed within the converter casing 1, and includes, as best can be seen in FIG. 1, three multi-layered strip members 7 which are wound around the central electrode 8 so as to overlap with each other in a scroll fashion with ends thereof being welded to an outer peripheral surface of the central electrode 8 in electrical communication therewith. Each of the multi-layered strip members 7 consists of flat thin metal foil sheets 3 and 5 and corrugated thin metal foil sheets 4 and 6. These foil sheets 3, 5, 4, and 6 contain, for example, 20% Cr, 5% Al, and 75% Fe, have a thickness on the order of 30 to 50 $\mu$m, wherein each layer is applied with electrically insulating by coatings, by, for example, alumina oxidation treatment. The electrically insulating coatings insulate the multi-layered strip members 7 from each other so as to form electric circuits extending spirally between the central electrode 8 and the converter casing 1 for allowing the multi-layered strip members 7 to heat up when the electric current is provided to flow between the central electrode 8 and the converter casing 1.

The corrugated foil sheet 4 is interposed between the flat foil sheets 3 and 5. The corrugated foil sheet 6 is attached to a surface of the flat foil sheet 5 opposite the surface to which the corrugated foil sheet 4 is attached. In practice, the foil sheets 3, 4, 5, and 6 are applied with nickel brazing metal, and then brazed to each other to form each of the multi-layered strip members 7.

Figure 3:
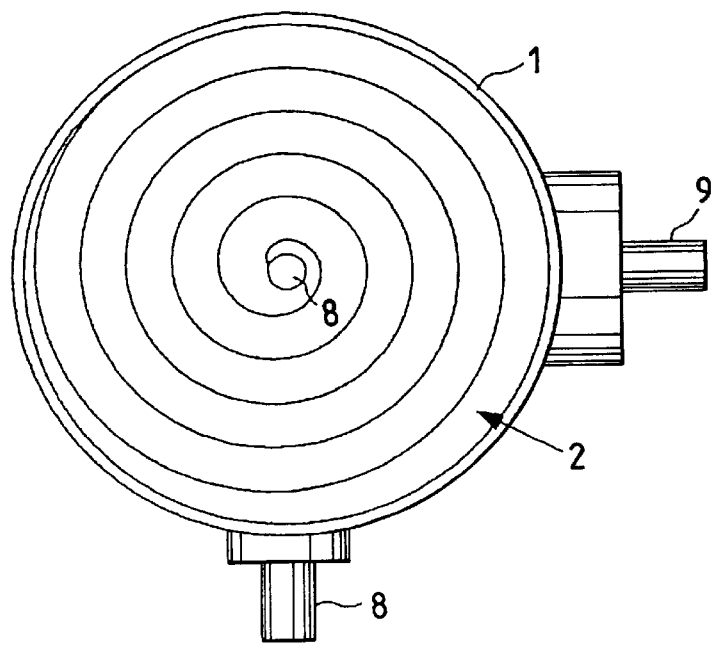
FIG 3 is an end view as viewed from an arrow A in FIG. 2.

The central positive electrode 8 is, as clearly shown in FIGS. 2 and 3, disposed within the converter casing 1 so as to extend longitudinally along the center line of the casing 1. The catalyst carrier 2 is attached, for example, brazed at outer ends of the multi-layered strip members 7 to an inner wall of the converter casing 1 in electrical communication therewith. A negative electrode 9 is, as shown in FIG. 3, connected to the outer surface of the converter casing 1. A portion of the central electrode 8 is, as shown in FIG. 2, bent at right angles so as to extend radially of the converter casing 1 and project outside the converter casing 1. An insulating member 10 is installed in the wall of the converter casing 1 to electrically insulate the central electrode 8 from the converter casing 1.

The catalyst carrier 2 is coated on its outer surface with catalyst. The converter casing 1 is disposed in an exhaust pipe of the internal combustion engine so as to allow the exhaust gases to pass therethrough. During the passage of the exhaust gases through the honeycomb catalyst carrier 2, harmful byproducts such as HC and CO contained in the exhaust gases are converted into harmless byproducts. In operation, at engine start-up, the voltage is applied across the positive electrode 8 and the negative electrode 9 to heat the catalyst carrier 2 for enhancing catalytic activity.

During an engine operation, the catalyst carrier 2 undergoes exhaust gas flow so that it is pushed downstream. The two flat metal foil sheets 3 and 5 however function to hold the corrugated metal foil sheets 4 and 6 from being displaced in the axial direction of the converter casing 1. Thus, even if the internal combustion engine 1 is operating at high load levels, the multi-layered construction of the catalyst carrier 2 prevents the foil sheets 3, 4, 5, and 6 from telescoping in the direction of exhaust gas flow, causing them to break up ultimately.

Figure 4:
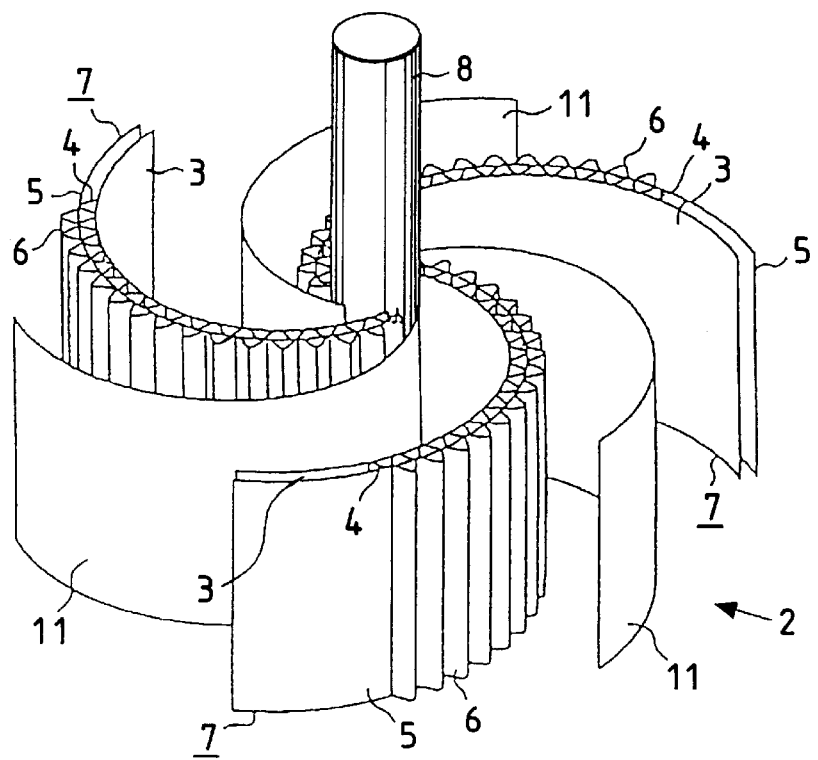
FIG. 4 is a perspective view which shows the second embodiment of the invention.

FIG. 4 shows the second embodiment of the invention. Only arrangements different from the above first embodiment will be discussed below.

In welding of the metal foil sheets 3, 4, 5, and 6, sheets of paper 11 are first sandwiched between the adjacent multi-layered strip members 7. The multi-layered strip members 7 are rolled around the central electrode 8 and then subjected to discharge welding. In the discharge welding, an electrode having the same size as that of an end surface of the catalyst carrier 2 is placed opposite the end of the catalyst carrier 2. The voltage is then applied across the electrode and the catalyst carrier 2 to fuse and weld contact portions between the flat foil sheets and the corrugated foil sheets to each other. The sheets of paper 11 prevent the adjacent foil sheets from being welded to each other during the discharge welding so that each of the multi-layered strip members 7 is formed only with the two flat foil sheets 3 and 5 and the two corrugated foil sheets 4 and 6. The paper 11 is burned out after the catalytic converter is used.

Figure 5:
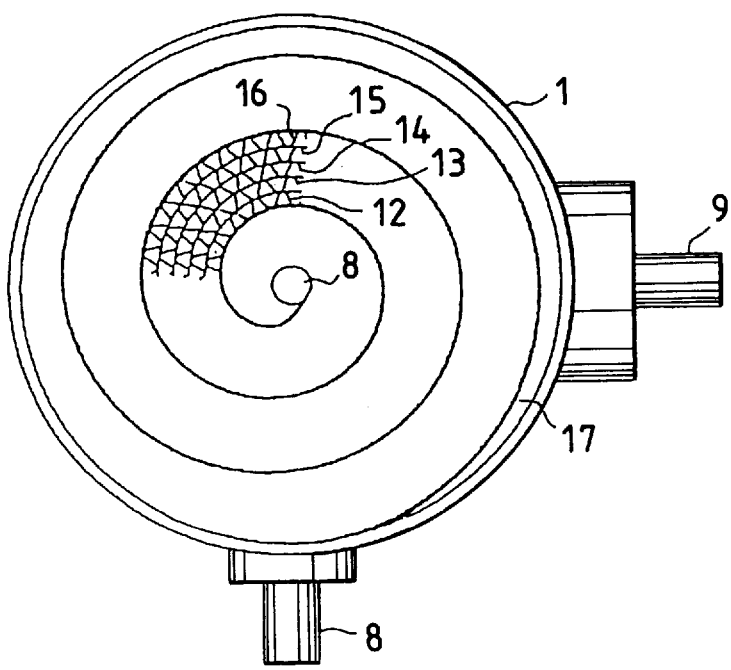
FIG. 5 is an end view which shows the third embodiment of the invention.

FIG. 5 shows the third embodiment of the invention. Only arrangements different from the first embodiment will be discussed below.

In this embodiment, three or more layers each consisting of one flat metal foil sheet and one corrugated metal foil sheet, are bonded to each other. FIG. 5 shows an example wherein five layers 12 to 16 are wound around the central electrode 8. The flat metal foil sheets and the corrugated metal foil sheets of the first to fifth layers 12 to 16 are all welded or brazed to each other. The thick line 17 indicates an interface between the first foil layer 12 and the adjacent fifth foil sheet 16 where they are not welded and insulated electrically from each other by oxide insulating coatings formed thereon.

Figure 6:
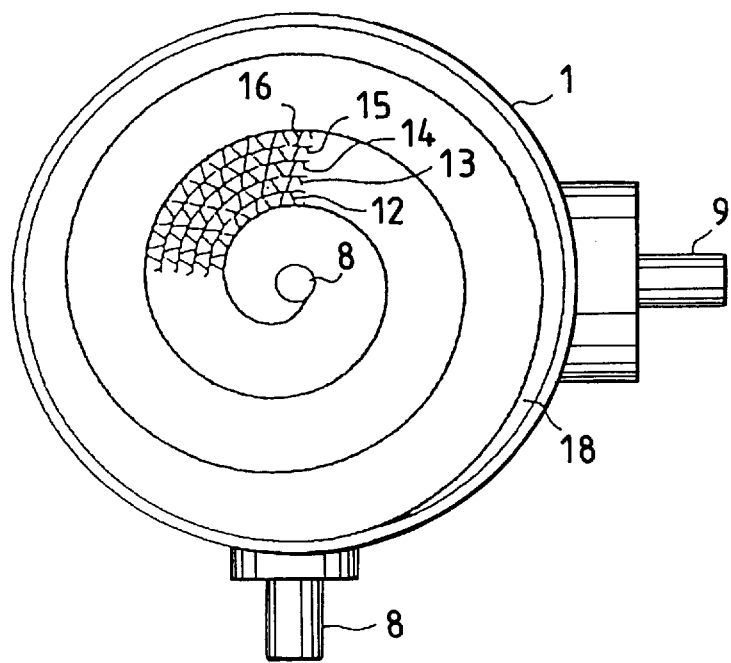
FIG. 6 is an end view which shows the fourth embodiment of the invention.
Figure 7:
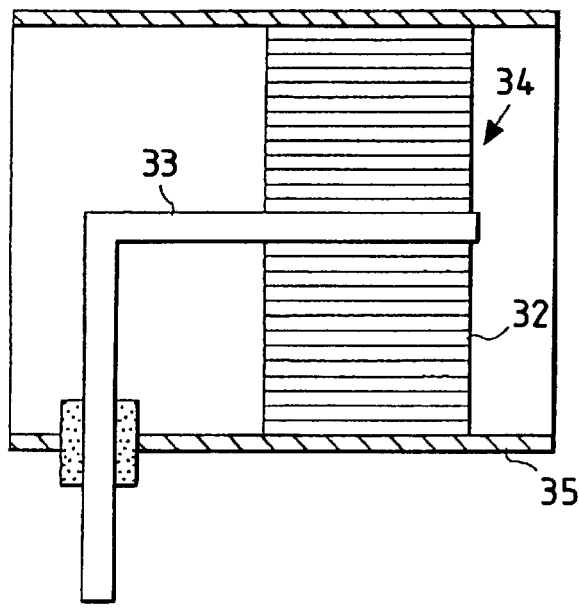
FIG. 7 is a cross sectional view which shows a conventional catalytic converter.
Figure 8:
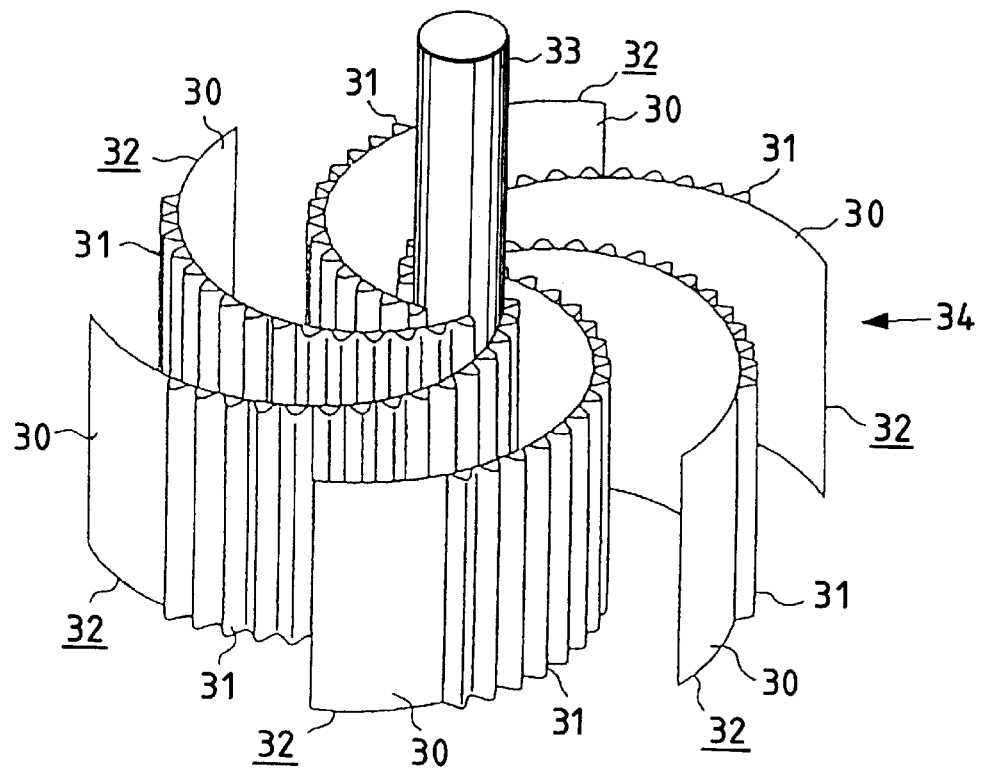
FIG. 8 is a perspective view which shows a catalyst carrier of a conventional catalytic converter.
Figure 9:
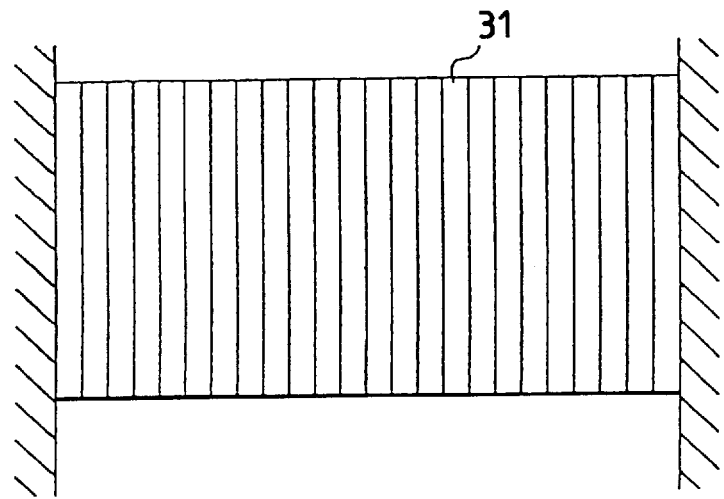
FIGS. 9 to 12 are cross sectional views for explanation of telescoping of a catalyst carrier of a conventional catalytic converter in a direction of exhaust gas flow during engine operation.
Figure 10:
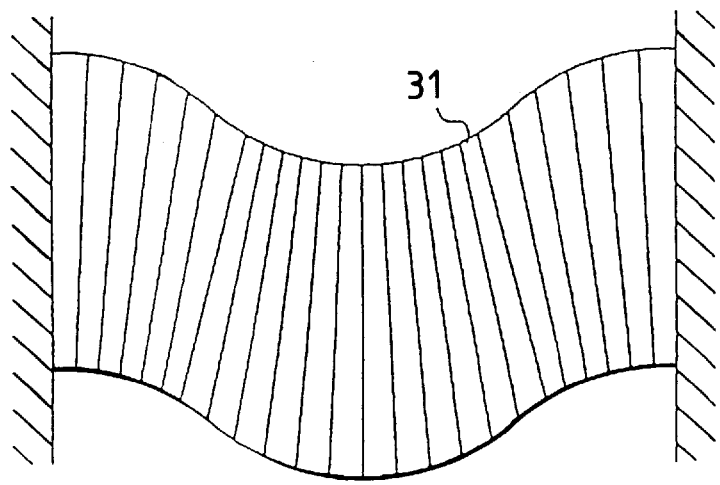
Figure 11:
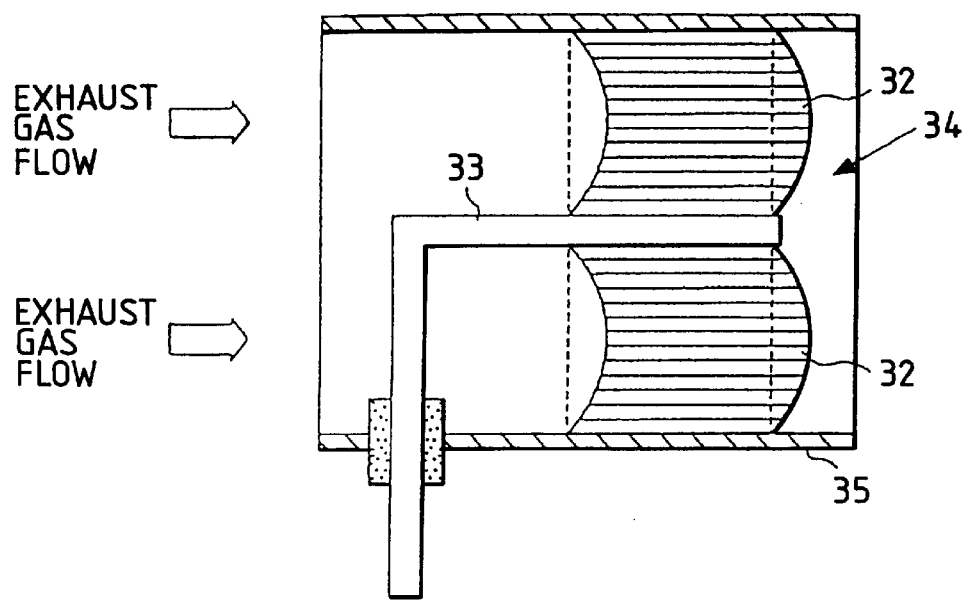
Figure 12:
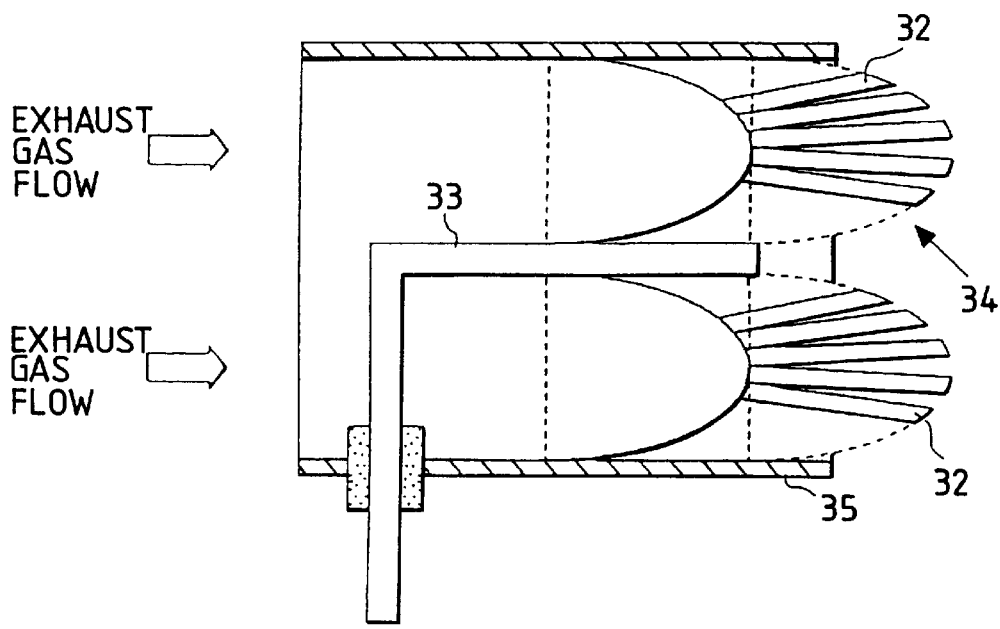

FIG. 6 shows the fourth embodiment of the invention. Only arrangements different from the third embodiment will be discussed below.

The flat metal foil sheets and the corrugated metal foil sheets of the first to fifth layers 12 to 16 are bonded to each other. The flat metal foil sheets and the corrugated metal foil sheets do not have oxide insulating coatings formed thereon, and are bonded to each other by means of brazing, electric welding (e.g., spot welding), or laser welding. Interposed between the first foil sheet 12 and the adjacent fifth foil sheet 16 is an insulating member 18 made of a ceramic plate or a ceramic film.

This embodiment is, as appreciated from the above, similar to the third embodiment in that the metal foil sheets of the first layer 12 to the fifth layer 16 are all bonded, however, is different therefrom in that the oxide insulating coatings are not formed on the surfaces of the flat foil sheets and the corrugated foil sheets. Thus, the foil sheets are bonded more firmly than the foil sheets having formed thereon the oxide insulating coatings, so that the mechanical strength of the catalytic converter is increased.

The insulating member 18 prevents the current density from increasing at a portion of the catalyst carrier 2 near the positive electrode 8. The catalyst carrier 2 is thus heated uniformly.

The insulating member 18 may be formed with a flat metallic foil applied with an insulating coating. Additionally, as an alternative to the insulating member 18, it is possible to form insulating layers only on the flat metal foil sheets and the corrugated metal foil sheets of the first and fifth layers 12 and 16.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, in the above embodiments, the corrugated metal foil sheets are rolled outside the flat metal foil sheets, however, the flat metal foil sheets may be rolled outside the corrugated metal foil sheets.

What is claimed is:

1. A method for manufacturing an electrically heatable catalytic converter comprising the steps of:

providing an electrode;

providing a plurality of flat metal foil sheets and a plurality of corrugated metal foil sheets which are arranged alternately;

interposing a sheet of paper between one of the flat metal foil sheets and adjacent corrugated metal foil sheet so as to form a plurality of multi-layered members separated by the paper each multi-layered member including at least two of the flat metal foil sheets and at least two of the corrugated metal foil sheets;

winding said multi-layered members around the electrode;

applying a voltage across the wound multi-layered members to weld the flat metal foil sheets and the corrugated metal foil sheets of each of the multi-layered members together and disposing the welded multi-layered members within a cylindrical converter casing.

\* \* \* \* \*